3,167,440
PLASTIC MODELING COMPOSITION OF A SOFT, PLIABLE WORKING CONSISTENCY

Noah W. McVicker and Joseph S. McVicker, Cincinnati, Ohio, assignors to Rainbow Crafts, Inc., Cincinnati, Ohio, a corporation of Ohio
No Drawing. Filed May 17, 1960, Ser. No. 29,573
16 Claims. (Cl. 106—150)

This invention relates to a plastic modeling composition of a soft pliable, working consistency for being molded into any desired shape or form and is slow-drying so as to be retained in a workable moldable condition for a long period of time to be repeatedly reworked and molded into different shapes and forms. It particularly pertains to a modeling composition for children's play, and is clean, non-sticky and non-staining.

This case is a continuation-in-part of application Serial No. 735,985, filed May 19, 1958, now abandoned.

One of the main objects of the invention is a modeling composition which may be reworked and remolded, or may be used for modeling objects which are more or less permanent.

Another object of the invention is a modeling composition which is easily compounded and is efficient in use Another object of the invention is a modeling composition which is non-toxic.

Another object of the invention is a modeling composition in which different colors may be incorporated without affecting its moldable consistency.

Still another object of the invention is a modeling composition which can be molded into objects adapted to be painted with conventional water and oil paints.

Further objects, and objects relating to details of construction and composition, will readily appear from the detailed description to follow. We have accomplished the objects of the invention by the means set forth in the following specification. The invention is clearly defined and pointed out in the appended claims, example compositions are also set forth for carrying out the invention. Generally described the invention comprises a composition consisting essentially of vegetable flour, such as grain flour which is adapted to be gelatinized; water, a hydrocarbon distillate preferably falling within the class consisting of a complex mixture of aromatic and aliphatic liquid hydrocarbon distillate derived from crude petroleum or shale or which may be made synthetically by combining lower boiling hydrocarbons and preferably having an initial boiling point of at least 60° C., and a soluble saline extender. Preferably also a drying agent, a hardener and astringent agent for binding the composition into a cohesive mass sometimes are included. Relatively small amounts of perfume or coloring, or both, may be added if desired. These latter two ingredients are not essential but optional to be used or not as may be desired.

Although any hydrocarbon distillate falling within the class defined above may be used it has been found that an excellent product is produced by the use of a hydrocarbon petroleum distillate such as typified by kerosene and preferably but not necessarily kerosene which has been deodorized. A kerosene of this type having an initial boiling point of approximately 150° C. has the advantage of not being so volatile as to be explosive. It is believed that the hydrocarbon distillate forms a thin film coating around the solid particles of the composition to give the composition a nice soft pliable texture. The coated flour particles, when extended by moist heat will gelatinize with the other particles into a homogenous mass which is soft and pliable without forming undesirable lumps therein. The homogeneous mass is maintained lump-free. The thin film coating in addition to giving the process mixture a soft and pliable texture also renders the mixture smooth and velvety so that it will not be sticky when coming into contact with other objects or the hands of the user.

Any grain flour may be used but wheat flour is preferred. However, any of the other grain flours may be used, and they may be used alone or in combination. Rye flour is preferred next to wheat flour. The grain flour forms the body of the mixture after gelatinzation occurs. It has been found during the manufacturing process that when wheat flour is used swelling begins at approximately 50° C. and gelatinization starts at approximately 65° C.

Any common salt that is soluble in water and is non-toxic may be employed. While sodium chloride is preferred, sodium hypochlorite and sodium chlorite may be used. The former is a common salt and is commonly used in tanneries and the latter is a bleaching agent commonly used for textile and paper pulp. In addition to the above, another common salt potassium chloride may also be used. None of the above salts will injure the flour. The term salt is used in its common ordinary meaning for indicating those materials which are commonly referred to as salt and are water soluble.

The drying agent includes such solid or powdered materials as borax, salicylic acid, sodium benzoate, sorbic acid, sodium and calcium propionate, calcium oxide, colemanite, resorite, and kernite. These materials may be used alone or in combination. All of these materials function as a drying agent and as such they have an antiseptic effect upon the compound in that they inhibit or prohibit the growth and activity of micro-organisms and thus preserve the desirable properties of the compound. Of these materials borax is preferred. Borax is a hydrous borate, and commercial borax under Federal specifications call for not less than 95.5% of hydrous sodium borate in three grades from large crystals to fine white powder. Although all three grades are suitable, the fine white powder is preferred. Thus, the purpose of these materials is to maintain the composition in good physical condition and to prevent it from getting wet and sticky and further as an agent to inhibit microbiological growth in the composition which would cause the product to mold and in other ways deteriorate.

The hardener and astringent agent may be any of the well known alums, such as potash and soda alum. The term alum refers to hydrated double sulphates of aluminum and univalent or trivalent metals, such as sodium, potassium or ammonium, chromium and iron. Some suitable alums are listed below, they being used alone or in combination:

$Na_2SO_4Al_2(SO_4)_324H_2O$, sodium aluminum sulphate
$K_2SO_4Al_2(SO_4)_324H_2O$, potassium aluminum sulphate
$Al_2(SO_4)_3(NH_4)_2SO_424H_2O$, aluminum ammonium sulphate
$CrNH_4(SO_4)12H_2O$, chromium ammonium sulfate
$CrK(SO_4)_212H_2O$, chromium potassium sulfate
$(NH_4)_2SO_4Fe_2(SO_4)_324H_2O$, ammonium ferric sulphate A hardener and astringent other than alum such as aluminum sulfate ($Al_2(SO_4)_3.18H_2O$) may be used, and in fact is preferable because it is iron free. This aluminum sulphate or its hydrates are sometimes incorrectly referred to as alums. Accordingly, they are included in the general class of alums although they have been separately grouped here.

The foregoing examples include some alums which are not iron-free, but iron-free alums such as $$Al_2(SO_4)_3.18H_2O$$

are preferred because they do not stain. The term alum is used in its common ordinary meaning and refers to alums as a class. Additional hardener and astringent agents which may be used are sodium chromium sulfate and potassium chromium sulfate. The function of the hardener and astringent agent is to bind the components of the composition into a cohesive mass.

The following are specific examples of new compositions of matter, made in accordance with the present invention:

*Example No. 1*

| | Percent |
|---|---|
| Grain flour (hard winter wheat flour, first clears preferred) | 41.90 |
| Tap water | 41.90 |
| Common salt | 14.50 |
| Light hydrocarbon distillate such as deodorized kerosene | 1.70 |

*Example No. 2*

| | Percent |
|---|---|
| Grain flour (hard winter wheat flour, first clears) | 41.70 |
| Tap water | 41.70 |
| Common salt | 14.50 |
| Borax | .40 |
| Light hydrocarbon distillate such as deodorized kerosene | 1.70 |

*Example No. 3*

| | Percent |
|---|---|
| Grain flour (hard winter wheat flour, first clears) | 41.50 |
| Tap water | 41.50 |
| Common salt | 14.50 |
| Iron free aluminum sulphate (alum) | 0.80 |
| Light hydrocarbon distillate such as deodorized kerosene | 1.70 |

*Example No. 4*

| | Percent |
|---|---|
| Grain flour (hard winter wheat flour, first clears) | 41.30 |
| Tap water | 41.30 |
| Common salt | 14.50 |
| Iron free aluminum sulphate (alum) | 0.80 |
| Borax | 0.40 |
| Light hydrocarbon distillate such as deodorized kerosene | 1.70 |

*Example No. 5*

| | Percent |
|---|---|
| Grain flour (hard winter wheat flour, first clears) | 38.55 |
| Tap water | 38.55 |
| Common salt | 21.00 |
| Light hydrocarbon distillate such as deodorized kerosene | 1.90 |

*Example No. 6*

| | Percent |
|---|---|
| Grain flour (hard winter wheat flour, first clears) | 38.25 |
| Tap water | 38.25 |
| Common salt | 21.00 |
| Borax | 0.60 |
| Light hydrocarbon distillate such as deodorized kerosene | 1.90 |

*Example No. 7*

| | Percent |
|---|---|
| Grain flour (hard winter wheat flour, first clears) | 38.05 |
| Tap water | 38.05 |
| Common salt | 21.00 |
| Iron free aluminum sulphate (alum) | 1.00 |
| Light hydrocarbon distillate such as deodorized kerosene | 1.90 |

*Example No. 8*

| | Percent |
|---|---|
| Grain flour (hard winter wheat flour, first clears) | 37.50 |
| Tap water | 37.50 |
| Common salt | 21.50 |
| Iron free aluminum sulphate (alum) | 1.00 |
| Borax | 0.60 |
| Light hydrocarbon distillate such as deodorized kerosene | 1.90 |

*Example No. 9*

| | Percent |
|---|---|
| Grain flour (hard winter wheat flour, first clears) | 44.50 |
| Tap water | 44.50 |
| Common salt | 10.10 |
| Light hydrocarbon distillate such as deodorized kerosene | 0.90 |

*Example No. 10*

| | Percent |
|---|---|
| Grain flour (hard winter wheat flour, first clears) | 44.32 |
| Tap water | 44.32 |
| Common salt | 10.10 |
| Borax | 0.36 |
| Light hydrocarbon distillate such as deodorized kerosene | 0.90 |

*Example No. 11*

| | Percent |
|---|---|
| Grain flour (hard winter wheat flour, first clears) | 44.15 |
| Tap water | 44.15 |
| Common salt | 10.10 |
| Iron free aluminum sulphate (alum) | 0.40 |
| Light hydrocarbon distillate such as deodorized kerosene | 1.20 |

*Example No. 12*

| | Percent |
|---|---|
| Grain flour (hard winter wheat flour, first clears) | 44.00 |
| Tap water | 44.00 |
| Common salt | 10.10 |
| Iron free aluminum sulphate (alum) | 0.65 |
| Borax | 0.30 |
| Light hydrocarbon distillate such as deodorized kerosene | 0.95 |

*Example No. 13*

| | Percent |
|---|---|
| Grain flour (hard winter wheat flour, first clears) | 57.00 |
| Tap water | 38.20 |
| Common salt | 4.00 |
| Light hydrocarbon distillate such as deodorized kerosene | 0.80 |

*Example No. 14*

| | Percent |
|---|---|
| Grain flour (hard winter wheat flour, first clears) | 38.20 |
| Tap water | 57.00 |
| Common salt | 4.00 |
| Light hydrocarbon distillate such as deodorized kerosene | 0.80 |

*Example No. 15*

| | Percent |
|---|---|
| Grain flour (hard winter wheat flour, first clears) | 57.00 |
| Tap water | 40.75 |
| Common salt | 1.00 |
| Borax | 0.45 |
| Light hydrocarbon distillate such as deodorized kerosene | 0.80 |

*Example No. 16*

| | Percent |
|---|---|
| Grain flour (hard winter wheat flour, first clears) | 57.00 |
| Tap water | 40.45 |
| Common salt | 1.00 |
| Iron free aluminum sulphate (alum) | 0.75 |
| Light hydrocarbon distillate such as deodorized kerosene | 0.80 |

*Example No. 17*

| | Percent |
|---|---|
| Grain flour (hard winter wheat flour, first clears) | 57.00 |
| Tap water | 40.00 |
| Common salt | 1.00 |
| Iron free aluminum sulphate (alum) | 0.80 |
| Borax | 0.70 |
| Light hydrocarbon distillate such as deodorized kerosene | 0.50 |

Example No. 18

| | Percent |
|---|---|
| Grain flour (hard winter wheat flour, first clears) | 30.00 |
| Tap water | 40.00 |
| Common salt | 25.00 |
| Light hydrocarbon distillate such as deodorized kerosene | 5.00 |

Example No. 19

| | Percent |
|---|---|
| Grain flour (hard winter wheat flour, first clears) | 40.00 |
| Tap water | 30.00 |
| Common salt | 25.00 |
| Light hydrocarbon distillate such as deodorized kerosene | 5.00 |

Example No. 20

| | Percent |
|---|---|
| Grain flour (hard winter wheat flour, first clears) | 30.00 |
| Tap water | 40.00 |
| Common salt | 25.00 |
| Borax | 1.50 |
| Light hydrocarbon distillate such as deodorized kerosene | 3.50 |

Example No. 21

| | Percent |
|---|---|
| Grain flour (hard winter wheat flour, first clears) | 30.00 |
| Tap water | 40.00 |
| Iron free aluminum sulphate (alum) | 24.00 |
| Light hydrocarbon distillate such as deodorized kerosene | 2.00 |
| Common salt | 4.00 |

Example No. 22

| | Percent |
|---|---|
| Grain flour (hard winter wheat flour, first clears) | 30.00 |
| Tap water | 40.00 |
| Common salt | 25.00 |
| Iron free aluminum sulphate (alum) | 2.20 |
| Borax | 0.80 |
| Light hydrocarbon distillate such as deodorized kerosene | 2.00 |

The specific examples of the composition, made in accordance with the present invention, just given are illustrative of the new compositions that may be made, however, it will be understood, of course, that all of the possible combinations have not been specifically described. In general, tests have shown that the flour and water ratios do not have to be one to one, however, when too much flour is used the mixture becomes too dry and crumbly whereas in the presence of excess water the mixture is too watery and it does not stick together in a moldable mass. Similarly, if too much hydrocarbon distillate is added the material becomes unduly oily and slick whereas in the absence of sufficient hydrocarbon distillate the compound becomes unduly sticky and clings to the mixing bowl as well as the hands of the user.

It has been found that a very excellent compound may be produced within the following ranges wherein the components of the composition are as follows:

| | | |
|---|---|---|
| Flour | pounds | 450–550 |
| Water | do | 450–550 |
| Salt | do | 75–200 |
| Hydrocarbon petroleum distillate | gallons | 1 to 3 |
| Hardening and astringent agent | pounds | 9–20 |
| Preservation, drying and antiseptic agent | do | 4–10 |
| Perfume | do | 1–2 |
| Coloring matter | do | 2 to 4 |

In addition to the specific foregoing examples and ranges, tests have shown that a suitable composition may be prepared when the proportions of the components of the composition fall within the following percentage ranges by weight:

Flour, 30 to 57%;
Water, 30 to 57%;
Salt, 1.00 to 25%;
Hydrocarbon distillate, 0.50 to 5.0%;
Preferably but optionally a drying antiseptic and preservative agent, 0.30% to 1.50%; and/or
A hardening and astringent agent, 0.40% to 4.0%, may also be added.

A relatively small quantity of perfume or coloring material, or both, may be included if desired. The perfume material may be of any of the ordinary and non-toxic type. Preferably one to two pounds of such perfume material is used for each 100 pound batch of the composition. It will be understood that the amount of perfume material used is not critical and it depends upon the strength of the particular perfume material used as well as upon the degree of fragrance desired in the final product. The perfume or aromatic oils are those comprising what are commonly referred to as essential oils or volatile oils.

The coloring material may be any of the dyes which are non-toxic and used for coloring food. They may be referred to generally and as a class, such as are certified to qualify under the provisions of the Federal Food Drug & Cosmetic Act. In those compositions where a neutral color is desired, no coloring matter is added. Even when used, only a very small quantity is required. Preferably about 2 oz. of the blue and red and about 4 oz. of the yellow dyes are used in a 1000 lb. batch of the composition.

The following is the preferred method for making the present new composition of matter, in accordance with the present invention. All of the components of the compound except the water, are mixed together in a suitable container such as an ordinary bakery dough mixer. The water is then heated preferably within a range between 155° to 230° F. and then dumped into the mixer containing the other materials or vice versa the other materials may be dumped into the container containing the water, and all are mixed into a homogenous mass until the flour is properly gelatinized. Normally such gelatinization is effected within about 7 to 30 minutes. We are unable to state definitely the theory upon which this process operates, because the reactions taking place in the mass are complicated. However it is believed that gelatinization of the starch cells begins first with the swelling of the compound at approximately 122° F., gelatinization is believed to start at approximately 149° F. and it is believed that the gelatinization completes at approximately 154° F. It will be understood that when the heated water is mixed with the other components of the compound the resulting temperature of the compound is less than the temperature to which the water was heated. The temperature of the resulting mixture must be at least 154° F. to insure gelatinization. It will be understood in the above recited process that the type of mixer is not critical and that any mixer which will produce a homogenous mass of the named ingredients will suffice. Preferably the water is heated to approximately 200° F. to 220° F. and this water added to the ingredients in the mixer and mixing carried out for about 15 minutes after which the modeling compound is released as a moldable mass and is immediately placed in air tight containers.

The modeling compound made according to the teachings of our invention has the following characteristics: It is soft, pliable and easy to handle; it is not sticky and may be worked quickly and smoothly in virtually any shape and form; it is non-staining and will not harm or mar desks, rugs, furniture, clothing or hands; it is non-toxic (not recommended for eating but no harm is done should a child accidentally swallow a piece of it); it is smooth and velvety and free of lumps; it may be painted with oil, water, or poster paints; if left in the open air it will dry hard within a few days or if placed in an oven of about 150° F. it may be dried thoroughly in 1 or 2 hours; once thoroughly dry the compound may not be reclaimed; and when hardened the compound may be colored with ordinary crayons. When hardened the compound may be sanded or carved to give a special effect. The compound is normally stored in an air tight container and after it has been played with it may be returned to the container with no ill effects. The compound when used in this way retains its pliability and other working characteristics for periods up to 3 years; and, if the compound is accidentally left out of its air tight container over night, for example, only the top ⅛ inch or so will begin to dry and this may be removed, the remaining compound remains fresh and pliable.

I am aware that the product herein disclosed may be varied without departing from the spirit of the present invention and therefore we have claimed our invention broadly as indicated by the appended claims.

It will be understood that modifications may be effected in our invention without departing from the scope and spirit thereof. It will be further understood that although we have shown our invention as embodied in certain combinations of materials and in certain process steps, we do not intend to be limited to such materials and steps except insofar as they are specifically set forth in the subjoined claims.

Having thus described our invention, what we claim as new and useful and desire to secure by United States Letters Patent is:

1. A smooth and velvety composition of matter which is soft, pliable, non-sticky, non-toxic substantially lump-free, re-workable and re-moldable consisting essentially of a mixture formed from about 450 to 550 pounds of grain flour, about 450 to 550 pounds of water, about 1 to 3 gallons of kerosene and about 75 to 200 pounds of a water soluble substantially non-toxic inorganic chlorine salt.

2. A composition according to claim 1 containing about 4 to 10 pounds of preservative, antiseptic and drying agent for the composition.

3. A composition according to claim 1 containing about 9 to 20 pounds of hardener and astringent agent, said hardener and astringent forming a binder for the composition.

4. A composition according to claim 1 containing about 4 to 10 pounds of preservative, antiseptic and drying agent and about 9 to 20 pounds of hardener and astringent agent, said hardener and astringent forming a binder for the composition.

5. The process of manufacturing a smooth and velvety composition of matter which is soft, pliable, non-sticky, non-toxic, substantially lump free, reworkable, remoldable, and especially adapted for children's play, including the steps of mixing together about 450 to 550 pounds of grain flour, about 1 to 3 gallons of kerosene, about 75 to 200 pounds of a water soluble substantially non-toxic inorganic chlorine salt, and thereafter mixing said ingredients with about 450 to 550 pounds of water which has been heated to a temperature capable of gelatinizing said grain flour and mixing into a homogenous mass.

6. The method according to claim 5 comprising adding about 4 to 10 pounds of preservative, antiseptic, and drying agent for the composition with said grain flour, salt, distillate mass.

7. A process in accordance with claim 5 comprising adding about 9 to 20 pounds of hardener and astringent to the flour, salt, distillate mass, said hardener and astringent forming a binder for the composition.

8. A process according to claim 5 comprising adding to said flour, salt, distillate mass about 4 to 10 pounds of preservative, antiseptic and drying agent for the composition and about 9 to 20 pounds of hardener and astringent agent, said hardener and astringent forming a binder for the composition.

9. A smooth and velvety composition of matter which is soft, pliable, non-sticky, non-toxic, substantially lump free, moldable into any desired shape, and of a consistency to retain its shape, and said composition consisting essentially of a mixture by weight of 30 to 57% of flour selected from the group consisting of wheat flour and rye flour, 30 to 57% of water, .5 to 5% of kerosene, and 1 to 25% of water soluble substantially non-toxic salt selected from the group consisting of sodium chloride, sodium hypochlorite, sodium chlorite and potassium chloride.

10. A composition of matter defined in claim 9 containing .4 to 4% of a hardening and astringent agent.

11. A composition of matter as defined in claim 9 containing .3 to 1.5% of a drying and preservative agent.

12. A composition of matter as defined in claim 10 wherein said hardening and astringent agent is selected from a group consisting of sodium aluminum sulfate, potassium aluminum sulfate, aluminum ammonium sulfate, chromium ammonium sulfate, chromium potassium sulfate and ammonium ferrite sulfate.

13. A composition of matter as defined in claim 11 wherein said drying and preservative agent is selected from a group consisting of borax, salicylic acid, sodium benzoate, sorbic acid, sodium and calcium propionate, calcium oxide, colemanite, rasorite and kernite.

14. The process of manufacturing a composition of matter which is soft, pliable, non-sticky, non-toxic, substantially lump free, moldable into any desired shape, of a consistency to retain its shape and especially adapted for children's play, said process including the steps of mixing together by weight about 30% to 57% of flour selected from the group consisting of wheat flour and rye flour, .5 to 5% kerosene, and 1 to 25% of salt selected from the group consisting of sodium chloride, sodium hypochlorite, sodium chlorite, and potassium chloride, and thereafter mixing the mixture of flour, kerosene and salt with 30 to 57% water which is at a temperature of 155° to 230° F. until a homogenous mass is formed.

15. A smooth and velvety composition of matter which is soft, pliable, non-sticky, non-toxic, substantially lump free, moldable into any desired shape, and of a consistency to retain its shape, and said composition consisting essentially of a mixture by weight of 30 to 57% of vegetable grain flour, 30 to 57% of water, .5 to 5% of kerosene, and 1 to 25% of water soluble substantially non-toxic salt selected from the group consisting of sodium chloride, sodium hypochlorite, sodium chlorite and potassium chloride.

16. A smooth and velvety composition of matter which is soft, pliable, non-sticky, non-toxic, substantially lump free, moldable into any desired shape, and of a consistency to retain its shape, and said composition consisting essentially of a mixture by weight of 30 to 57% of vegetable grain flour, 30 to 57% of water, .5 to 5% of kerosene, and 1 to 25% of water soluble substantially non-toxic salt selected from the group consisting of sodium chloride, sodium hypochlorite, sodium chlorite and potassium chloride.

References Cited in the file of this patent

UNITED STATES PATENTS

| | | |
|---|---|---|
| 1,261,995 | Ampt | Apr. 9, 1918 |
| 1,777,161 | Biddle | Sept. 30, 1930 |
| 1,893,608 | Atwood | Jan. 10, 1933 |
| 2,096,684 | Neufeld | Oct. 19, 1937 |
| 2,127,298 | Isaacs | Aug. 16, 1938 |
| 2,269,509 | Batelja | Jan. 13, 1942 |
| 2,450,258 | Skolnik | Sept. 28, 1948 |